US009637075B2

(12) United States Patent
Atsumi et al.

(10) Patent No.: US 9,637,075 B2
(45) Date of Patent: May 2, 2017

(54) VEHICLE LOWER SECTION STRUCTURE

(71) Applicant: TOYOTA JIDOSHA KABUSHIKI KAISHA, Toyota-shi (JP)

(72) Inventors: Hyuga Atsumi, Toyota (JP); Tetsuo Nuruki, Toyota (JP); Daisuke Teramoto, Toyota (JP); Kayoko Hasegawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/741,895

(22) Filed: Jun. 17, 2015

(65) Prior Publication Data
US 2016/0001817 A1 Jan. 7, 2016

(30) Foreign Application Priority Data

Jul. 4, 2014 (JP) ................. 2014-138923

(51) Int. Cl.
*B62D 25/02* (2006.01)
*B60R 19/02* (2006.01)
*B62D 25/20* (2006.01)

(52) U.S. Cl.
CPC .......... *B60R 19/023* (2013.01); *B62D 25/025* (2013.01); *B62D 25/20* (2013.01); *B62D 25/2045* (2013.01)

(58) Field of Classification Search
CPC .... B62D 21/15; B62D 21/152; B62D 25/025; B62D 25/20; B62D 25/2009; B62D 25/2018; B62D 25/2036; B62D 25/2045
See application file for complete search history.

(56) References Cited

U.S. PATENT DOCUMENTS

| 3,073,647 A | * | 1/1963 | Beltz | B62D 25/025 296/204 |
| 3,791,472 A | * | 2/1974 | Tatsumi | B62D 21/02 180/312 |
| 4,514,008 A | * | 4/1985 | Watanabe | B60K 15/073 280/835 |

(Continued)

FOREIGN PATENT DOCUMENTS

| DE | EP 1382514 A1 * | 1/2004 | ......... B62D 25/2036 |
| FR | EP 1693284 A1 * | 8/2006 | ........... B62D 21/152 |

(Continued)

*Primary Examiner* — Glenn Dayoan
*Assistant Examiner* — Paul Chenevert
(74) *Attorney, Agent, or Firm* — Oblon, McClelland, Maier & Neustadt, L.L.P.

(57) ABSTRACT

There is provided a vehicle lower section structure including a rocker that extends in a vehicle front-rear direction at a vehicle width direction outer side, a tunnel section that extends in the vehicle front-rear direction at a central portion in the vehicle width direction, a pair of dash cross members that extend in the vehicle width direction at a lower side of a dash panel, that are separated by the tunnel section, tunnel reinforcement that is disposed at a lower side in the vehicle up-down direction that extends in the vehicle front-rear direction, wherein a first front flange is formed at a front end of the dash cross member in the vehicle front-rear direction, and wherein a second front flange is disposed at a position opposing the first front flange across the dash panel or a floor section.

3 Claims, 7 Drawing Sheets

(56) References Cited

U.S. PATENT DOCUMENTS

| | | | | |
|---|---|---|---|---|
| 4,892,350 A * | 1/1990 | Kijima | B62D 25/025 | 296/187.12 |
| 5,921,618 A * | 7/1999 | Mori | B62D 21/157 | 296/187.12 |
| 5,992,921 A * | 11/1999 | Seki | B62D 21/152 | 296/187.09 |
| 6,095,592 A * | 8/2000 | Nakatani | B62D 21/152 | 296/187.09 |
| 6,145,923 A * | 11/2000 | Masuda | B62D 25/082 | 296/1.03 |
| 6,209,948 B1 * | 4/2001 | Mori | B62D 21/152 | 296/187.09 |
| 6,588,832 B2 * | 7/2003 | Sakuma | B62D 21/152 | 296/203.01 |
| 6,805,401 B2 * | 10/2004 | Sato et al. | B62D 21/152 | 296/187.08 |
| 6,860,547 B2 * | 3/2005 | Winter | B62D 25/08 | 180/90 |
| 6,926,352 B2 * | 8/2005 | Gotou | B62D 21/157 | 296/187.08 |
| 7,014,256 B2 * | 3/2006 | Kamura | B62D 25/2036 | 296/1.03 |
| 7,118,167 B2 * | 10/2006 | Nakamura | B62D 21/10 | 296/193.07 |
| 7,188,893 B2 * | 3/2007 | Akasaka | B62D 21/152 | 296/187.08 |
| 7,500,714 B2 * | 3/2009 | Abe | B62D 21/157 | 296/187.09 |
| 7,823,964 B2 * | 11/2010 | Tasumi | B62D 21/157 | 296/204 |
| 7,832,795 B2 * | 11/2010 | Yokoi | B62D 25/2018 | 296/193.02 |
| 8,011,695 B2 * | 9/2011 | Kosaka | B62D 21/152 | 280/784 |
| 8,029,050 B2 * | 10/2011 | Tamakoshi | B62D 21/152 | 296/193.06 |
| 8,485,591 B2 * | 7/2013 | Kihara | B62D 25/082 | 296/193.07 |
| 8,490,988 B2 * | 7/2013 | Takeshita | B62D 21/155 | 280/124.109 |
| 8,556,336 B2 * | 10/2013 | Yasuhara | B62D 21/11 | 296/193.07 |
| 8,585,134 B2 * | 11/2013 | Yasui | B62D 21/152 | 296/204 |
| 8,668,252 B2 * | 3/2014 | Yasuhara | B62D 21/152 | 296/187.08 |
| 8,702,148 B2 * | 4/2014 | Ichikawa | B62D 25/08 | 180/90 |
| 9,096,275 B2 * | 8/2015 | Yasui | B62D 21/11 | |
| 9,096,276 B2 * | 8/2015 | Komiya | B62D 21/155 | |
| 9,102,364 B2 * | 8/2015 | Bosche | B62D 25/20 | |
| 9,180,916 B2 * | 11/2015 | Nishida | B62D 25/2036 | |
| 9,238,485 B2 * | 1/2016 | Atsumi | B62D 25/20 | |
| 9,266,568 B2 * | 2/2016 | Nishino | B62D 25/2045 | |
| 2015/0008703 A1 * | 1/2015 | Furusaki | B62D 21/152 | 296/187.08 |
| 2015/0298742 A1 * | 10/2015 | Ono | B62D 21/11 | 296/187.09 |
| 2016/0052561 A1 * | 2/2016 | Atsumi | B62D 25/2018 | 296/187.08 |
| 2016/0068196 A1 * | 3/2016 | Saeki | B62D 25/2036 | 296/187.08 |

FOREIGN PATENT DOCUMENTS

| | | | | |
|---|---|---|---|---|
| FR | 2945267 A3 * | 11/2010 | | B62D 21/02 |
| JP | 2005-162144 | 6/2005 | | |
| JP | 3741020 B2 * | 2/2006 | | B62D 25/2018 |
| JP | 2013-166435 | 8/2013 | | |
| JP | 2013-169806 | 9/2013 | | |
| JP | 2014-043133 | 3/2014 | | |
| JP | DE 102014009394 | * 12/2014 | | B62D 25/20 |
| JP | WO 2015079928 A1 * | 6/2015 | | B62D 25/20 |

* cited by examiner

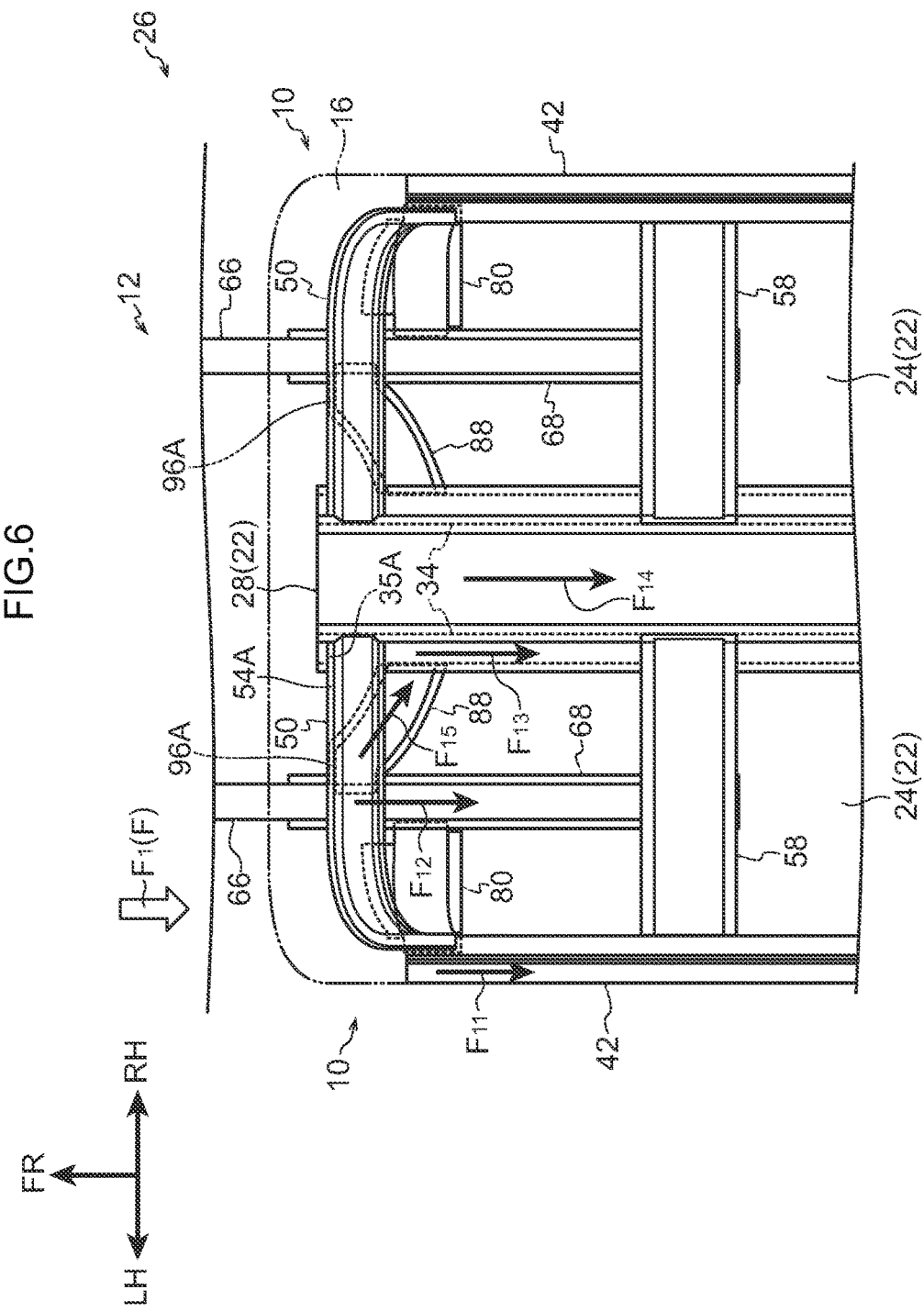

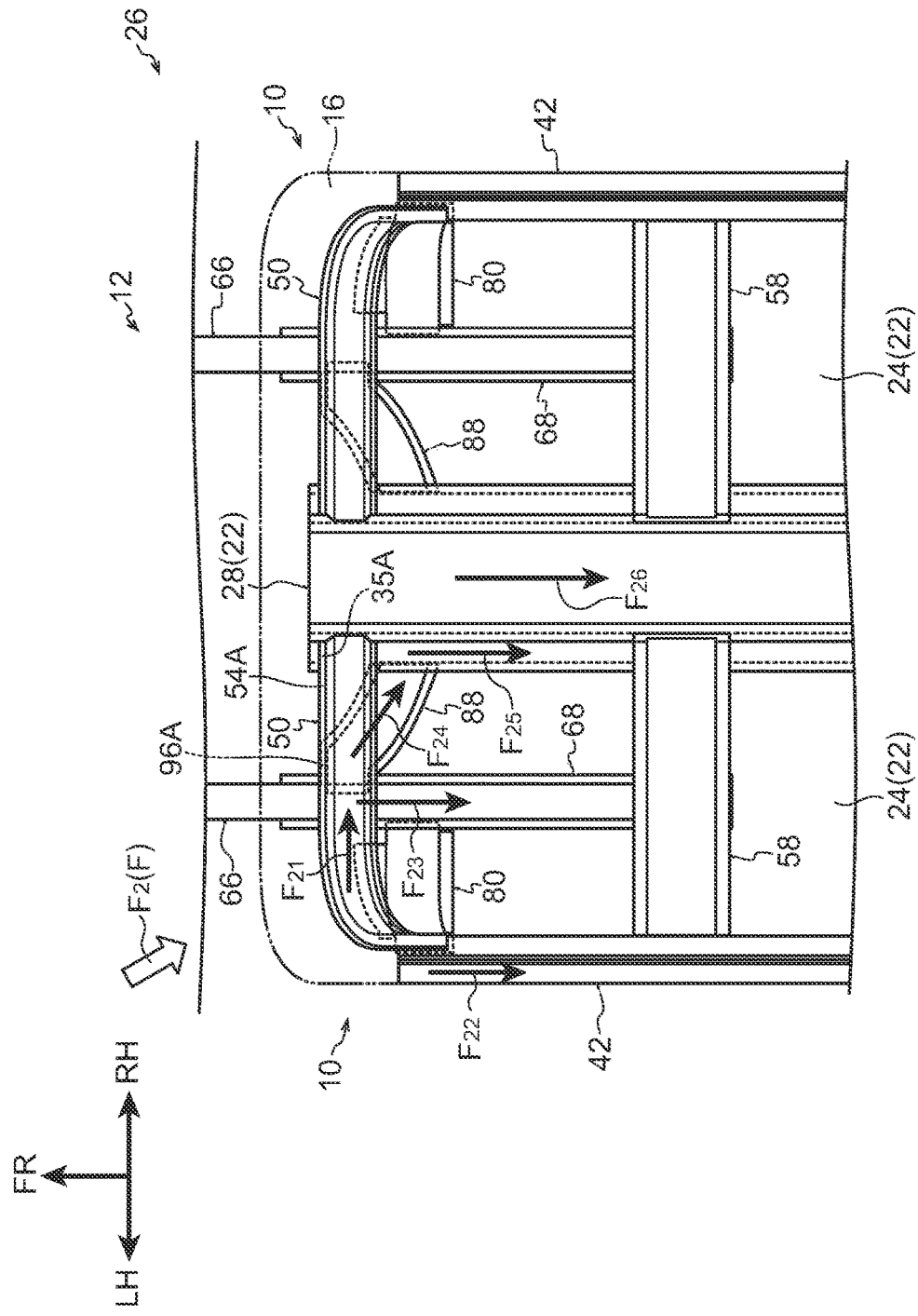

VEHICLE LOWER SECTION STRUCTURE

CROSS-REFERENCE TO RELATED APPLICATION

This application claims priority under 35 USC 119 from Japanese Patent application No. 2014-138923 filed on Jul. 4, 2014, the disclosure of which is incorporated by reference herein.

BACKGROUND

Technical Field

The present disclosure relates to a vehicle lower section structure.

Related Art

Japanese Patent Application Laid-Open (JP-A) No. 2013-169806, for example, describes a structure in which a dashboard cross member (dash cross member) couples together left and right rockers so as to straddle a tunnel section provided at a central portion of a floor panel in the vehicle width direction. An outrigger is installed along the vehicle width direction between the rockers and a rear end portion of a front side frame, and a lateral direction frame is installed along the vehicle width direction between the rear end portion of the front side frame and the tunnel section.

In the related art of JP-A No. 2013-169806, the dashboard cross member is joined to the outrigger and the lateral direction frame, thereby enabling collision load to be supported when collision load is input to the vehicle width direction outside of the dashboard cross member. Similarly to JP-A No. 2013-169806, JP-A No. 2013-166435 and JP-A No. 2014-43133 also describe structures in which a dash cross members straddle a tunnel section of a floor panel to couple together left and right rockers.

However, in such related art, the dash cross members straddle the tunnel section, resulting in structures in which the dash cross members project out to the upper side of the tunnel section, toward the vehicle compartment side. Space inside the vehicle compartment is accordingly reduced, reducing the degrees of freedom for design with regards to placement of devices installed to an instrument panel and the like, leaving room for improvement in this respect.

SUMMARY

In consideration of the above circumstances, the present disclosure obtains a vehicle lower section structure capable of efficiently transmitting impact load toward a tunnel section side when impact load has been input to a dash cross member, while securing degrees of freedom for design peripheral to an instrument panel.

A first aspect of the present disclosure is a vehicle lower section structure including a rocker that extends in a vehicle front-rear direction at a vehicle width direction outer side of a floor section of a vehicle compartment, a tunnel section that extends in the vehicle front-rear direction at a central portion of the floor section in the vehicle width direction, and that projects toward the upper side in a vehicle up-down direction, a pair of dash cross members that extend in the vehicle width direction at a lower side of a dash panel provided at a front portion of the floor section in the vehicle front-rear direction, that are separated by the tunnel section, and that couple together the rocker and the tunnel section, and tunnel reinforcement that is disposed at a lower side of the floor section in the vehicle up-down direction and at an outer side of the tunnel section in the vehicle width direction, and that extends in the vehicle front-rear direction, wherein a first front flange is formed at a front end of the dash cross member in the vehicle front-rear direction, and is joined to either the dash panel or the floor section, and wherein a second front flange is formed at a front end of the tunnel reinforcement in the vehicle front-rear direction, and is joined to either the dash panel or the floor section at a position opposing the first front flange across the dash panel or the floor section.

In the vehicle lower section structure of the first aspect, the rocker extends in the vehicle front-rear direction at the vehicle width direction outside of the floor section of the vehicle compartment, and the tunnel section extends in the vehicle front-rear direction at a central portion of the floor section in the vehicle width direction, and projects toward the upper side in the vehicle up-down direction. The pair of dash cross members extend in the vehicle width direction at the lower side of the dash panel provided at the front portion of the floor section in the vehicle front-rear direction, are separated by the tunnel section, and couple together the rocker and the tunnel section.

Due to the dash cross members being separated by the tunnel section, the upper side of the tunnel section does not project out toward the vehicle compartment by the presence of the dash cross members. The space inside the vehicle compartment is therefore not affected. There are accordingly increased degrees of freedom for design with regards to, for example, the placement of devices installed on an instrument panel.

The tunnel reinforcement is disposed at the lower side of the floor section in the vehicle up-down direction and at the outside of the tunnel section in the vehicle width direction, and extends in the vehicle front-rear direction. The second front flange is formed at the front end of the tunnel reinforcement in the vehicle front-rear direction. The first front flange is formed at a front end of the dash cross member in the vehicle front-rear direction. The second front flange of the tunnel reinforcement is joined to the either the dash panel or the floor section at a position opposing the first front flange across the dash panel or the floor section.

Suppose, for example, that the front end of the dash cross member and the front end of the tunnel reinforcement were disposed offset with respect to each other in the vehicle front-rear direction. In such a configuration, in a frontal collision of the vehicle at the vehicle width direction outside of a front side member, known as a small overlap collision or a diagonal collision (oblique collision), there is a possibility that a time lag may arise during transmission of impact load transmitted to the dash cross member to the tunnel reinforcement, or that concentrated locations of the impact load transmitted from the dash cross member could arise in the tunnel reinforcement.

Accordingly, in the first aspect, the front end of the tunnel reinforcement (second front flange) is joined to the dash panel or the floor section in a state opposing the front end of the dash cross member (first front flange) across the dash panel or the floor section. This thereby enables impact load transmitted to the dash cross member in a frontal collision to be efficiently transmitted to the tunnel reinforcement, in a state in which load transmission loss is suppressed.

Accordingly, a load transmission path from the dash cross member to the tunnel section side can be secured even when a configuration in which the dash cross members are separated by the tunnel section is adopted. Accordingly in the first aspect, impact load input to the dash cross member can be distributed to at least the rocker and the tunnel section.

A second aspect of the present disclosure is the vehicle lower section structure of the first aspect, further including a side member that is disposed at the outer side of the tunnel section in the vehicle width direction and at a front side of the floor section in the vehicle front-rear direction, and that extends in the vehicle front-rear direction, and an inner torque box that is disposed between the side member and the tunnel reinforcement at an angle toward the vehicle width direction inner side on progression toward the vehicle front-rear direction rear side, with a front end of the inner torque box joined to a vehicle width direction inner side of the side member, and a rear end of the inner torque box joined to the tunnel reinforcement.

In the vehicle lower section side of the second aspect, the side member is disposed at the outside of the tunnel section in the vehicle width direction and at the front side of the floor section in the vehicle front-rear direction, and the side member extends in the vehicle front-rear direction. The inner torque box is disposed between the side member and the tunnel reinforcement at an angle toward the vehicle width direction inside on progression toward the vehicle front-rear direction rear side. The front end of the inner torque box is joined to the vehicle front-rear direction rear side and the vehicle width direction inside of the side member, and the rear end of the inner torque box is joined to the tunnel reinforcement.

In the second aspect, the inner torque box is installed between the side member and the tunnel reinforcement. In the event of an oblique collision, folding of the side member toward the vehicle width direction inside, referred to as inward folding deformation, due to impact load transmitted to the side member through the dash cross member, can accordingly be suppressed.

Moreover, the inner torque box is installed in a state substantially along the input direction of impact load transmitted to the dash cross member in an oblique collision. A load transmission path can accordingly be obtained that transmits impact load transmitted to the dash cross member from the side member, through the inner torque box, and into the tunnel reinforcement.

A third aspect of the present disclosure is the vehicle lower section structure of the second aspect, wherein a third front flange is formed at a front end of the inner torque box in the vehicle front-rear direction, and is joined to either the dash panel or the floor section at a position opposing the first front flange across the dash panel or the floor section.

In the vehicle lower section structure of the third aspect, the third front flange is formed at the front end of the inner torque box in the vehicle front-rear direction. The third front flange is joined to either the dash panel or the floor section at a position opposing the first front flange formed to the front end of the dash cross member in the vehicle front-rear direction across the dash panel or the floor section. In the event of a small overlap collision or an oblique collision, this thereby enables impact load transmitted to the dash cross member to be efficiently transmitted from the inner torque box to the tunnel reinforcement, in a state in which load transmission loss is suppressed.

As described above, the vehicle lower section structure according to the first aspect enables efficient transmission of impact load to the tunnel section side when impact load has been input to the dash cross member, while securing degrees of freedom for design peripheral to an instrument panel.

The vehicle lower section structure according to the second aspect enables a load transmission path that transmits load transmitted to the dash cross member to the side member, the inner torque box, and the tunnel reinforcement to be secured.

The vehicle lower section structure according to the third aspect enables collision load transmitted to the dash cross member to be effectively transmitted to the tunnel reinforcement through the inner torque box.

BRIEF DESCRIPTION OF THE DRAWINGS

Exemplary embodiments of the present disclosure will be described in detail based on the following figures, wherein:

FIG. 6 is a plan view corresponding to FIG. 2, illustrating operation of a vehicle lower section structure according to the present exemplary embodiment in the event of a small overlap collision; and FIG. 7 is a plan view corresponding to FIG. 2, illustrating operation of a vehicle lower section structure according to the present exemplary embodiment in the event of an oblique collision.

DETAILED DESCRIPTION

Explanation follows regarding a vehicle lower section structure according to an exemplary embodiment of the present disclosure, based on the drawings. In each of the drawings, the arrow FR, the arrow UP, the arrow RH, and the arrow LH respectively indicate the front direction, the upward direction, the right direction, and the left direction of a vehicle applied with a vehicle lower section structure 10 according to an exemplary embodiment of the present disclosure, as appropriate. Unless specifically indicated otherwise, reference to the front and rear, up and down, and left and right directions refers to the front and rear in the vehicle front-rear direction, up and down in the vehicle up-down direction, and the left and right when facing in the forward direction.

Vehicle Lower Section Structure Configuration

Figure 2:
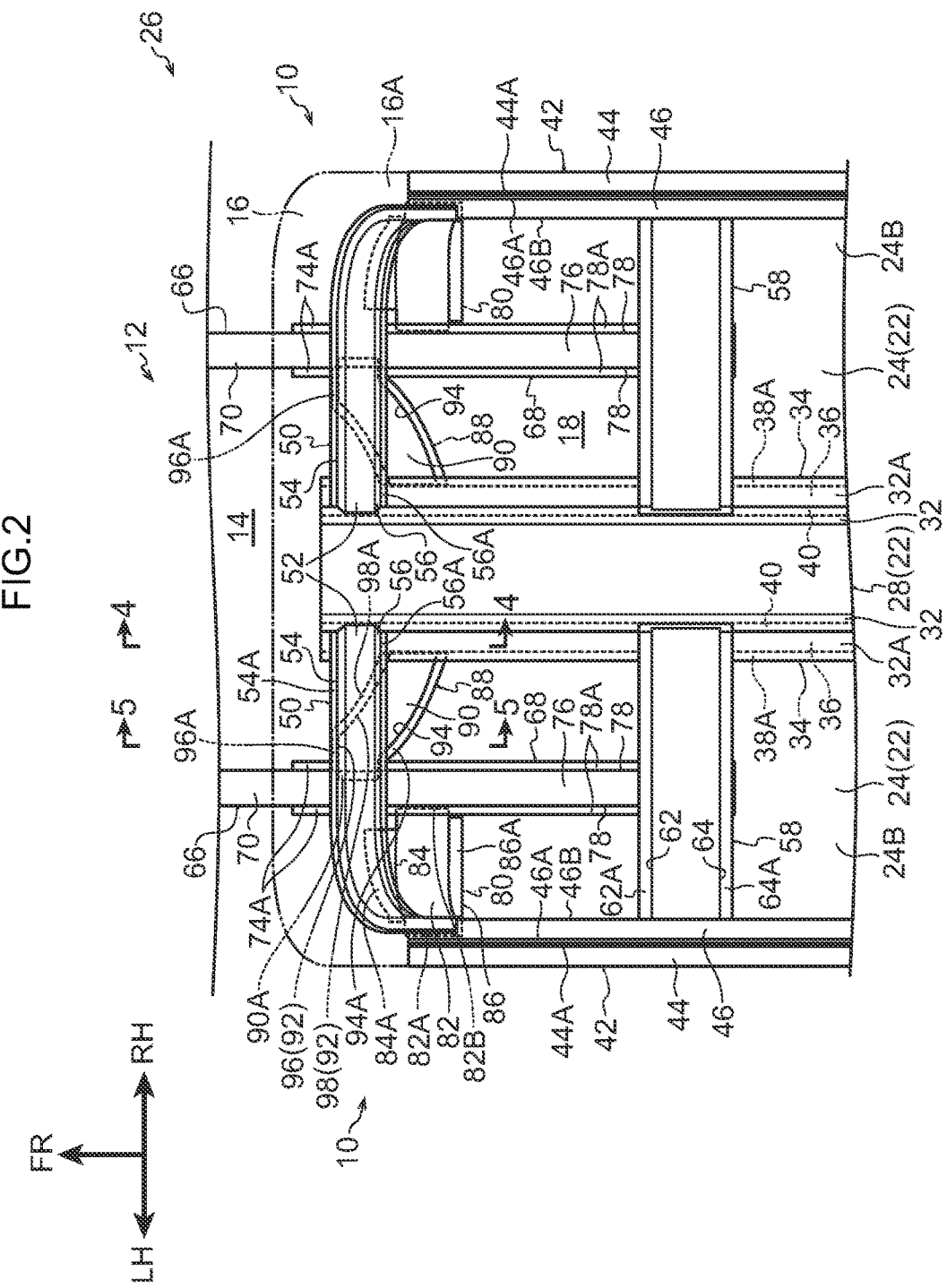
FIG. 2 is a plan view illustrating a vehicle lower section structure according to the present exemplary embodiment.

First, explanation follows regarding configuration of the vehicle lower section structure according to the present exemplary embodiment. FIG. 2 is a plan view illustrating the vehicle lower section structure 10 according to the present exemplary embodiment, and FIG. 4 is a cross-section taken along line 4-4 in FIG. 2.

Figure 4:
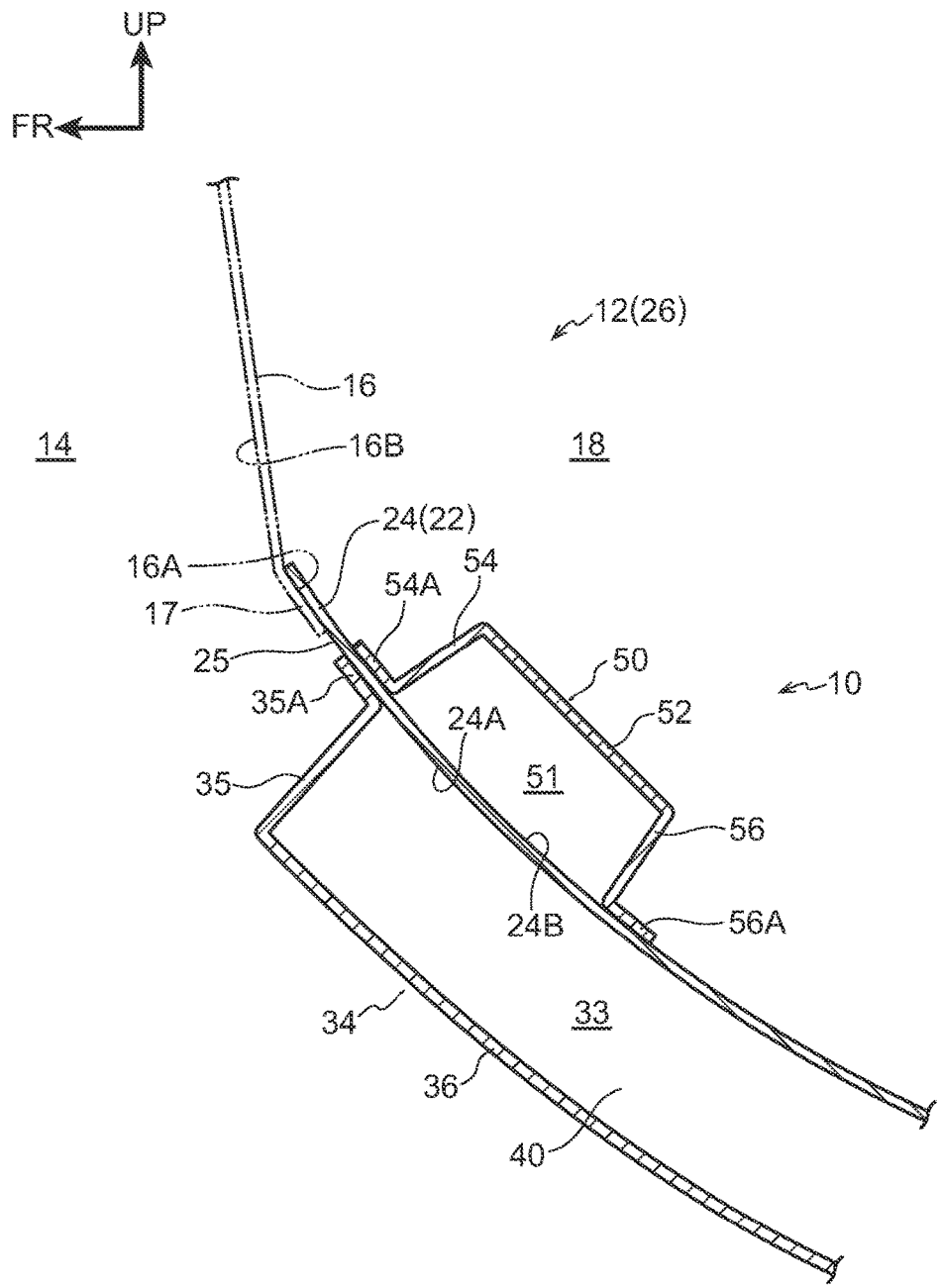
FIG. 4 is a cross-section taken along line 4-4 in FIG. 2.

As illustrated in FIG. 2 and FIG. 4, a vehicle front section 12 includes an engine room 14. The engine room 14 is separated from a vehicle compartment 18 by a dash panel 16. Front end portions 25 of floor panels 24, configuring part of a floor section 22 of the vehicle compartment 18, are joined by welding or the like to a rear face 16A of a lower end portion 17 of the dash panel 16, thereby integrating together the dash panel 16 and the floor panels 24.

Figure 1:
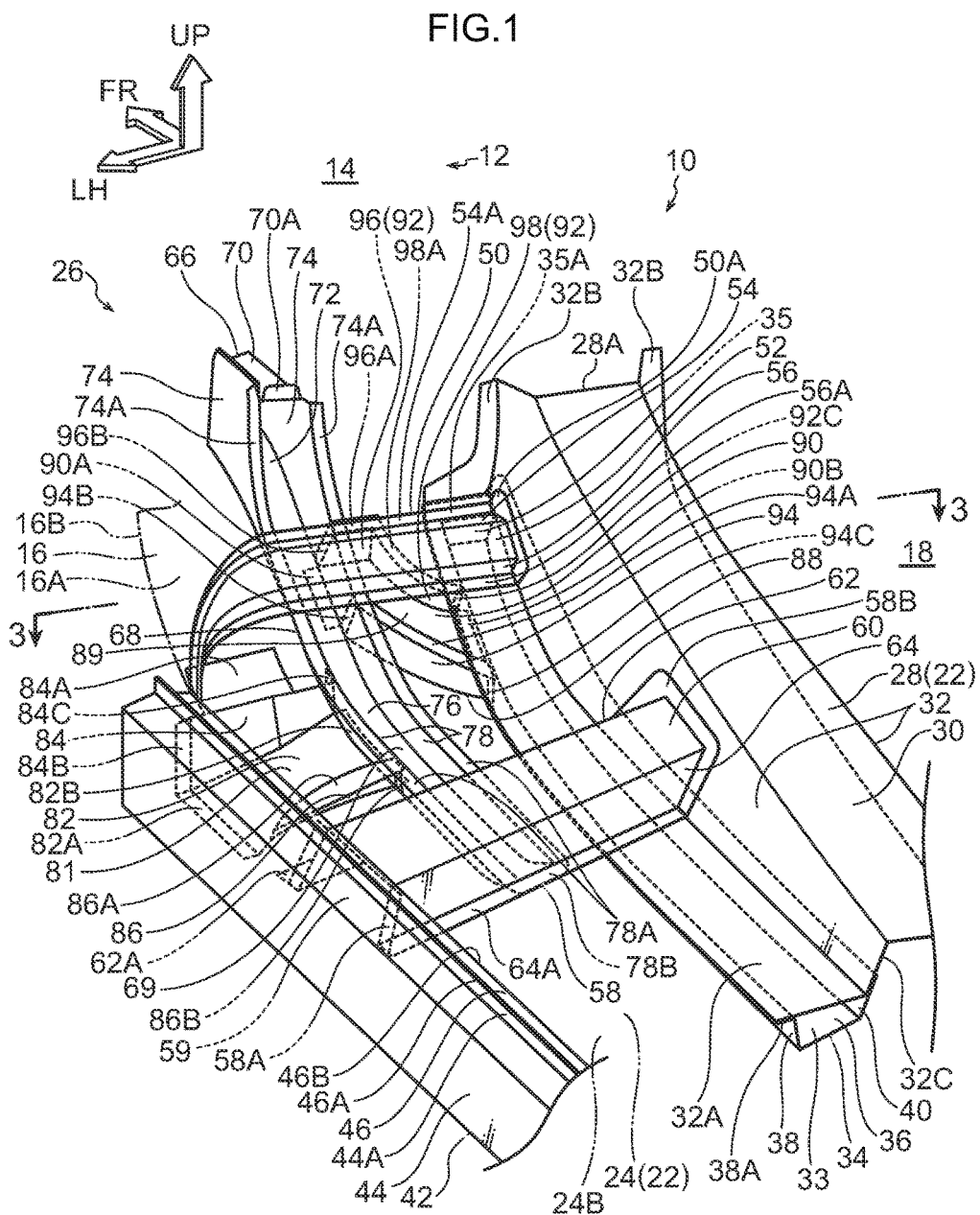
FIG. 1 is a perspective view of the left side of a front section of a vehicle, illustrating a vehicle lower section structure according to an exemplary embodiment.
Figure 3:
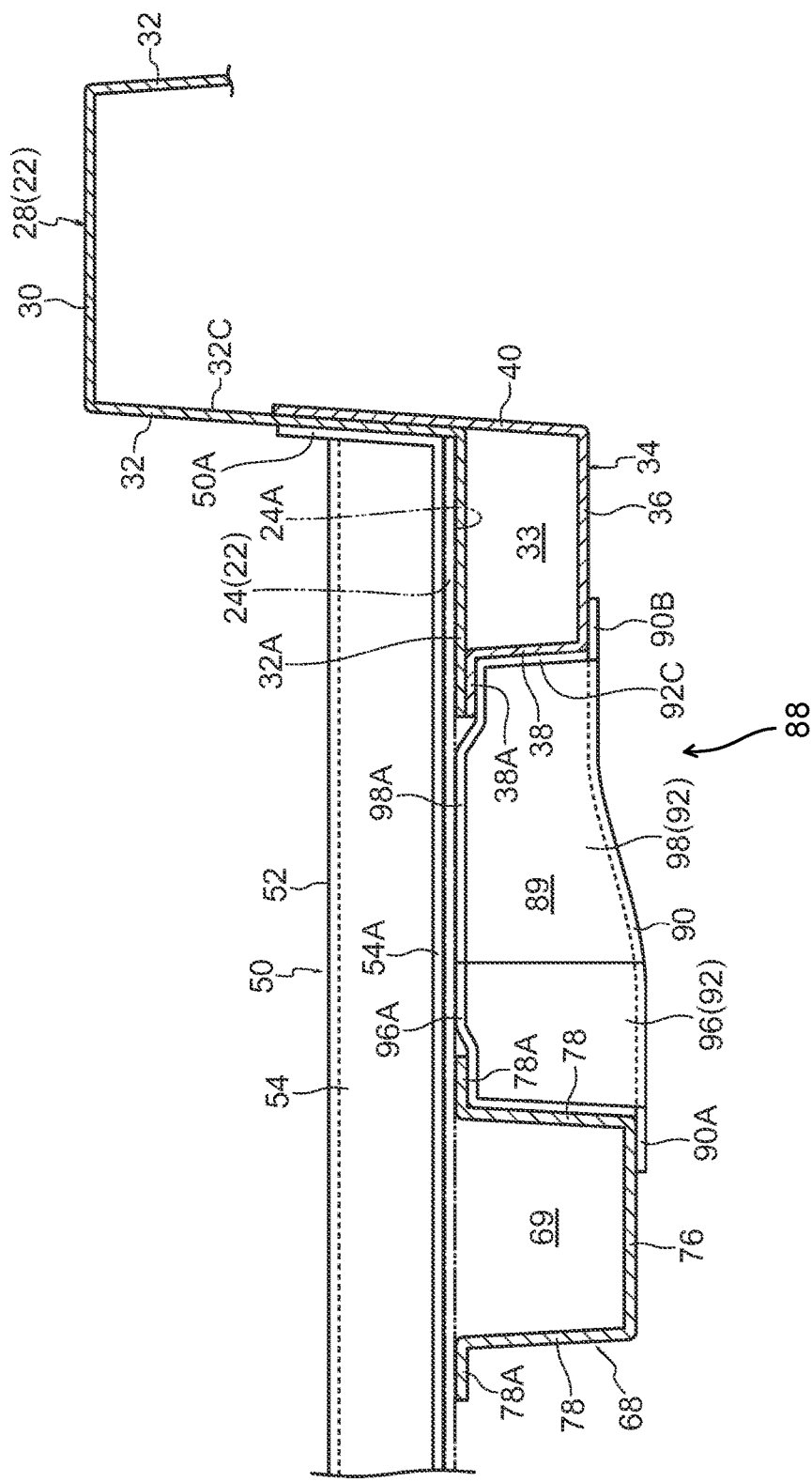
FIG. 3 is a cross-section taken along line 3-3 in FIG. 1.

The floor panels 24 are divided to the left and right of a vehicle 26. A tunnel section 28 extends along the vehicle front-rear direction at a vehicle width direction central portion between the pair of floor panels 24. FIG. 1 is a perspective view illustrating the vehicle lower section structure 10 from the left side, and FIG. 3 is a cross-section taken along line 3-3 in FIG. 1. As illustrated in FIG. 3, the tunnel section 28 configures another part of the floor section 22. A cross-section profile of the tunnel section 28 as taken along the vehicle width direction forms an inverted substantially U-shape, opening toward the lower side, and the tunnel section 28 includes an upper wall 30 and a pair of side walls 32 that are positioned to the left and right of the upper wall 30.

The pair of side walls 32 configure inclined wall portions inclined toward the vehicle width direction outside on progression from vehicle width direction outside edges of the upper wall 30 toward the lower side. Outer flanges 32A, bent toward the vehicle width direction outside, extend from lower ends of the side walls 32, and the outer flanges 32A are joined to respective lower faces 24A of the floor panels 24 by welding or the like. The floor panels 24 and the tunnel section 28 are accordingly integrated together. Note that the floor panels 24 and the tunnel section 28 may also be integrally formed.

As illustrated in FIG. 1, at a front end portion 28A of the tunnel section 28, outer flanges 32B, bent toward the outside, extend from the side walls 32 and the outer flanges 32A along directions substantially orthogonal to the length direction of the tunnel section 28. The outer flanges 32B are joined to a rear face 16A of the dash panel 16 by welding or the like.

Lower tunnel reinforcement 34 extends in the vehicle front-rear direction along each of the outer flanges 32A formed to the tunnel section 28 in the vehicle front-rear direction, at a lower side of the outer flanges 32A. A cross-section profile of the lower tunnel reinforcement 34 as taken along the vehicle width direction forms a substantially U-shape, opening toward the upper side, and the lower tunnel reinforcement 34 includes a lower wall 36 and side walls 38, 40 that are positioned to the left and right of the lower wall 36.

The side wall 40 of the lower tunnel reinforcement 34 is positioned to the inside of the tunnel section 28, and is formed longer than the side wall 38 positioned to the outside of the tunnel section 28. The side wall 40 faces an inner face 32C of the side wall 32 of the tunnel section 28, and is joined to the side wall 32 of the tunnel section 28 by welding or the like.

An outer flange 38A, bent toward the outside, extends from an upper end of the side wall 38 of the lower tunnel reinforcement 34, and faces the outer flange 32A of the tunnel section 28. The outer flange 38A is joined to the outer flange 32A by welding or the like. A closed cross-section portion 33 is thereby formed between the lower tunnel reinforcement 34 and the outer flange 32A of the tunnel section 28.

As illustrated in FIG. 4, a front wall 35 is provided at a front end of the lower tunnel reinforcement 34. A front flange 35A, serving as a second front flange, extends out from an upper end of the front wall 35 toward the front side. The front flange 35A of the lower tunnel reinforcement 34 is joined to the lower face 24A of the floor panel 24 by welding or the like.

As illustrated in FIG. 2, rockers 42 extend along the vehicle front-rear direction at the vehicle width direction outsides of the left and right floor panels 24. Each rocker 42 is configured including a rocker outer panel 44 disposed on the vehicle width direction outside, and a rocker inner panel 46 disposed on the vehicle width direction inside.

The rocker outer panel 44 and the rocker inner panel 46 are respectively formed with substantially hat-shaped cross-section profiles, opening toward mutually facing sides. Pairs of upper and lower flanges 44A, 46A are joined together by welding, thereby forming a closed cross-section profile extending in the vehicle front-rear direction. Although not illustrated in the drawings, an upper flange bent to the upper side from an outer edge portion of the floor panel 24 in the vehicle width direction is joined by welding or the like to a side face 46B on the vehicle width direction inside of the rocker inner panel 46.

As illustrated in FIG. 1 and FIG. 2, at the sides of the respective front end portions 25 (see FIG. 4) of the floor panels 24, respective dash cross members 50, running in the vehicle width direction, span between the rocker inner panels 46 of the rockers 42 and lower portions of the side walls 32 of the tunnel section 28, in a state in which they are separated by the tunnel section 28.

Figure 5:
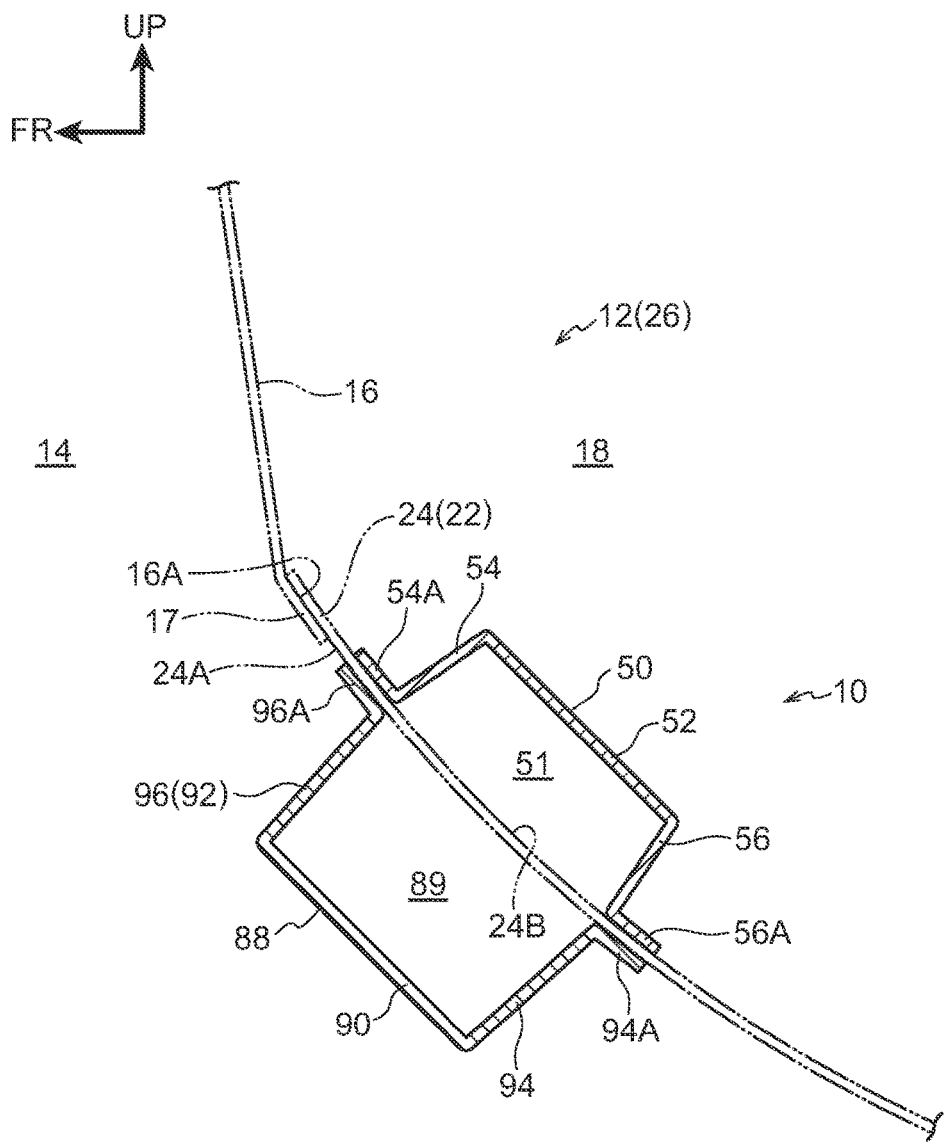
FIG. 5 is a cross-section taken along line 5-5 in FIG. 2.

As illustrated in FIG. 5, the cross-section profile of each dash cross member 50 as taken along the vehicle front-rear direction forms an inverted substantially U-shape, opening toward the lower side. Each dash cross member 50 includes an upper wall 52, and a front wall 54 and a rear wall 56 positioned to the front and rear of the upper wall 52.

A front flange 54A, serving as a first front flange, extends out bent toward the front from a lower end of the front wall 54, and a rear flange 56A extends out bent toward the rear from a lower end of the rear wall 56. The front flange 54A and the rear flange 56A are each joined by welding or the like to an upper face 24B of the floor panel 24. A closed cross-section portion 51 is thereby formed between the dash cross member 50 and the floor panel 24.

Note that the front flange 35A of the lower tunnel reinforcement 34 described above is joined by welding or the like to the lower face 24A of the floor panel 24 at a position opposing the front flange 54A across the floor panel 24.

As illustrated in FIG. 1 and FIG. 2, on the rocker 42 side of each dash cross member 50, the dash cross member 50 curves toward the rear side, and the heights of the front wall 54 and the rear wall 56 decrease, on progression toward the vehicle width direction outside. The dash cross member 50 is joined by welding or the like so as to cover the side face 46B on the vehicle width direction inside of the rocker inner panel 46.

On the tunnel section 28 side of each dash cross member 50, an outer flange 50A extends from outer ends of the upper wall 52, the front wall 54, and the rear wall 56, and is bent toward the outside along directions substantially orthogonal to the length direction of the dash cross member 50. The outer flange 50A is formed in an inverted substantially U-shape as viewed along the length direction of the dash cross member 50, and is joined by welding or the like to the side wall 32 of the tunnel section 28.

A floor cross member 58 extends along the vehicle width direction at the rear side of the dash cross member 50. The cross-section profile of the floor cross member 58 as taken along the vehicle front-rear direction forms an inverted substantially U-shape, opening toward the lower side, and the floor cross member 58 includes an upper wall 60, and a front wall 62 and a rear wall 64 positioned to the front and rear of the upper wall 60.

A front flange 62A, bent toward the front, extends out from a lower end of the front wall 62, and a rear flange 64A, bent toward the rear, extends out from a lower end of the rear wall 64. The front flange 62A and the rear flange 64A are each joined by welding or the like to the upper face 24B of the floor panel 24. A closed cross-section portion 59 is thereby formed between the floor cross member 58 and the floor panel 24.

On the rocker 42 side of each floor cross member 58, an outer flange 58A extends from outer ends of the upper wall 60, the front wall 62, and the rear wall 64, and is bent toward the outside along directions substantially orthogonal to the length direction of the floor cross member 58. The outer flange 58A is formed in an inverted substantially U-shape as viewed along the length direction of the floor cross member 58, and is joined by welding or the like to the side face 46B on the vehicle width direction inside of the rocker inner panel 46.

On the tunnel section 28 side of each floor cross member 58, an outer flange 58B extends from outer ends of the upper wall 60, and front wall 62, and the rear wall 64, and is bent toward the outside along directions substantially orthogonal to the length direction of the floor cross member 58. The outer flange 58B is formed in an inverted substantially U-shape as viewed along the length direction of the floor cross member 58, and is joined by welding or the like to the side wall 32 of the tunnel section 28.

In the vehicle front section 12, front side members 66 extend along the vehicle front-rear direction, between the respective rockers 42 and the tunnel section 28 in the vehicle width direction. Each front side member 66 is formed with a substantially rectangular shaped cross-section profile as taken along the vehicle width direction. The front side member 66 is angled so as to follow a front face 16B of the dash panel 16, and extends to the lower face 24A side of the floor panel 24. In the following explanation, a portion of the front side member 66 up to the front face 16B of the dash panel 16 is referred to as the front side member 66, and a portion of the front side member 66 to the rear side of the front face 16B of the dash panel 16 is referred to as a side member 68.

The front side member 66 is configured including an upper wall 70, a lower wall 72, and a pair of side walls 74. An upper flange 70A, bent upwards, extends out from a rear end of the upper wall 70 of the front side member 66. Outer flanges 74A, bent toward the outsides, extend out along the vehicle width direction from rear ends of the side walls 74 of the front side member 66. The upper flange 70A and the outer flanges 74A are joined by welding or the like to the front face 16B of the dash panel 16.

As taken along the vehicle width direction, the side member 68 has a substantially U-shaped cross-section profile, opening toward the upper side. The side member 68 is configured including a lower wall 76 and a pair of side walls 78. Outer flanges 78A respectively extend out from upper ends of the side walls 78 of the side member 68, and are bent toward the vehicle width direction outsides. The outer flanges 78A are joined by welding or the like to the lower face 24A (see FIG. 3) of the floor panel 24. A closed cross-section portion 69 is thereby formed between the side member 68 and the floor panel 24.

The side walls 78 of the side member 68 are formed with decreasing height on progression toward the rear side, and a rear flange 78B is formed at a rear end portion of the side member 68. The rear flange 78B is joined by welding or the like to the lower face 24A of the floor panel 24, at a position opposing the rear flange 64A of the floor cross member 58 across the floor panel 24.

An outer torque box 80 extends in the vehicle width direction between a substantially central portion in the length direction of the side member 68, and a front end side of the rocker 42. The cross-section profile of the outer torque box 80 as taken along the vehicle front-rear direction is formed in a substantially U-shape, opening toward the upper side, and the outer torque box 80 includes a lower wall 82, and a front wall 84 and a rear wall 86 respectively positioned to the front and rear of the lower wall 82.

A front flange 84A, bent toward the front, extends out from an upper end of the front wall 84. The front flange 84A is formed facing the rear face 16A of the dash panel 16, and is joined by welding or the like to the rear face 16A of the dash panel 16.

A rear flange 86A, bent toward the rear, extends out from an upper end of the rear wall 86. The rear flange 86A is formed facing the lower face 24A (see FIG. 3) of the floor panel 24, and is joined by welding or the like to the lower face 24A of the floor panel 24. A closed cross-section portion 81 is thereby formed between the outer torque box 80 and the floor panel 24.

At the rocker 42 side of the outer torque box 80, an outer flange 82A extends from an outer end of the lower wall 82 in the length direction of the outer torque box 80. The outer flange 82A is joined by welding or the like to a lower face (not illustrated in the drawings) on the inside of the rocker inner panel 46. An outer flange 84B extends from an outer end of the front wall 84 of the outer torque box 80 in the length direction of the outer torque box 80, and the outer flange 84B is joined by welding or the like to a front end of the rocker inner panel 46.

At the side member 68 side of the outer torque box 80, an outer flange 82B extends from an outer end of the lower wall 82 in the length direction of the outer torque box 80. Outer flanges 84C, 86B, respectively bent toward the front side and the rear side, extend from outer ends of the front wall 84 and the rear wall 86. The outer flanges 84C, 86B are joined by welding or the like to the side wall 78 of the side member 68, and the outer flange 82B is joined by welding or the like to the lower wall 76 of the side member 68.

An inner torque box 88 is disposed between the front end side of the side member 68 and the front end side of the lower tunnel reinforcement 34. The inner torque box 88 is disposed further to the front side than the outer torque box 80, and is installed in a state angled toward the rear side on progression from the side member 68 side toward the lower tunnel reinforcement 34 side.

As taken along the vehicle front-rear direction, the cross-section profile of the inner torque box 88 is formed in a substantially U-shape, opening toward the upper side, and the inner torque box 88 includes a lower wall 90, and a front wall 92 and a rear wall 94 respectively positioned to the front and rear of the lower wall 90. The front wall 92 is configured by a lateral wall 96 formed running in the vehicle width direction, and an angled portion 98 angled toward the rear side on progression from the side member 68 side toward the lower tunnel reinforcement 34 side. The rear wall 94 is formed substantially parallel to the angled portion 98.

Front flanges 96A, 98A, bent toward the front, extend out from upper ends of the lateral wall 96 and the angled portion 98 respectively. A rear flange 94A bent toward the rear extends out from an upper end of the rear wall 94. The front flanges 96A, 98A and the rear flange 94A are respectively joined by welding or the like to the lower face 24A (see FIG. 5) of the floor panel 24, thereby forming a closed cross-section portion 89 between the inner torque box 88 and the floor panel 24.

Note that as illustrated in FIG. 5, the front flange 96A is joined by welding or the like to the lower face 24A of the floor panel 24 at a position opposing the front flange 54A of the dash cross member 50 across the floor panel 24.

Moreover, as illustrated in FIG. 1, on the side member 68 side of the inner torque box 88, outer flanges 96B, 94B, respectively bent toward the front side and the rear side, extend out from outer ends of the lateral wall 96 and the rear wall 94. The outer flanges 96B, 94B are joined by welding or the like to the side wall 78 of the side member 68.

On the side member 68 side of the inner torque box 88, an outer flange 90A extends out from an outer end of the lower wall 90, in the length direction of the inner torque box 88. The outer flange 90A is joined by welding or the like to the lower wall 76 of the side member 68.

On the lower tunnel reinforcement 34 side of the inner torque box 88, outer flanges 92C, 94C, respectively bent toward the front side and the rear side, extend out from outer ends of the front wall 92 and the rear wall 94. The outer flanges 92C, 94C are joined by welding or the like to the side wall 38 of the lower tunnel reinforcement 34.

On the lower tunnel reinforcement 34 side of the inner torque box 88, an outer flange 90B extends out from an outer end of the lower wall 90, in the length direction of the inner torque box 88. The outer flange 90B is joined by welding or the like to the lower wall 36 of the lower tunnel reinforcement 34.

Operation and Advantageous Effects of Vehicle Lower Section Structure

Next, explanation follows regarding operation and advantageous effects of the vehicle lower section structure 10 according to the present exemplary embodiment.

As illustrated in FIG. 1 and FIG. 2, in the present exemplary embodiment, the dash cross members 50 installed along the vehicle width direction on the front end portion 25 side of the floor panel 24 are separated by the tunnel section 28. Since the dash cross members 50 do not project out above the tunnel section 28 toward the vehicle compartment 18 side, the space inside the vehicle compartment 18 is not affected. There are accordingly increased degrees of freedom for design with regards to, for example, the placement of devices installed on an instrument panel (not illustrated in the drawings).

Explanation is now given envisaging a frontal collision of the vehicle 26 in which a collision (impact load; $F_1$), known as a small overlap collision, occurs offset at the vehicle width direction outside of the front side member 66, as illustrated in FIG. 6. Although not illustrated in the drawings, were, for example, the front end of the dash cross member 50 and the front end of the lower tunnel reinforcement 34 to be disposed offset with respect to each other in the vehicle front-rear direction, in a frontal collision such as described above, it is possible that a time lag may arise during transmission of impact load (F) transmitted to the dash cross member 50 to the lower tunnel reinforcement 34, or that concentrated locations of the impact load transmitted from the dash cross member 50 could arise in the lower tunnel reinforcement 34.

Accordingly, as illustrated in FIG. 4, in the present exemplary embodiment the front flange 54A of the dash cross member 50 and the front flange 35A of the lower tunnel reinforcement 34 are joined to the floor panel 24 so as to oppose each other across the floor panel 24. This thereby enables impact load (F) transmitted to the dash cross member 50 in a frontal collision to be efficiently transmitted to the lower tunnel reinforcement 34, in a state in which load transmission loss is suppressed.

A load transmission path from the dash cross member 50 to the tunnel section 28 side can accordingly be secured, even when a configuration is adopted in which the dash cross members 50 are separated by the tunnel section 28. In the present exemplary embodiment, impact load $F_1$ input to the dash cross member 50 can therefore be distributed to the tunnel section 28 (load; $F_{14}$) through at least the rocker 42 (load; $F_{11}$), the side member 68 (load; $F_{12}$), and the lower tunnel reinforcement 34 (load; $F_{13}$).

Namely, deformation of framework members installed in the vehicle lower section can be suppressed, and incursion of the dash panel 16 toward the vehicle compartment 18 side can also be suppressed. Note that a portion of the load transmitted by the tunnel section 28 is transmitted through the tunnel section 28 to framework members, including the dash cross member 50, on the opposite side to the collision side.

In the present exemplary embodiment, the inner torque box 88 is installed between the side member 68 and the lower tunnel reinforcement 34. A portion of the load ($F_{13}$) transmitted to the lower tunnel reinforcement 34 (load; $F_{13}$) accordingly includes load ($F_{15}$) transmitted from the dash cross member 50 to the inner torque box 88.

Explanation is now given envisaging a frontal collision of the vehicle 26 in which a diagonal collision (impact load; $F_2$), known as an oblique collision, occurs at the vehicle width direction outside of the front side member 66, as illustrated in FIG. 7. In the present exemplary embodiment, the inner torque box 88 is installed between the side member 68 and the lower tunnel reinforcement 34. In a frontal collision such as that described above, folding of the side member 68 toward the vehicle width direction inside, referred to as inward folding deformation, due to load ($F_{21}$) transmitted through the dash cross member 50 to the side member 68, can accordingly be suppressed.

The inner torque box 88 is installed in a state substantially along the input direction of the impact load ($F_2$) transmitted to the dash cross member 50 in an oblique collision. A load transmission path can accordingly be obtained that transmits impact load ($F_2$) transmitted to the dash cross member 50 from the side member 68, through the inner torque box 88, and into the lower tunnel reinforcement 34.

The present exemplary embodiment accordingly enables the impact load $F_2$ input to the dash cross member 50 to be distributed from the lower tunnel reinforcement 34 (load; $F_{25}$) to the tunnel section 28 (load; $F_{26}$), through at least the rocker 42 (load; $F_{22}$), the side member 68 (load; $F_{23}$), and the inner torque box 88 (load; $F_{24}$). A portion of the load transmitted by the tunnel section 28 is transmitted through the tunnel section 28 to framework members, including the dash cross member 50, on the opposite side to the collision side.

Due to the above, in the vehicle lower section structure 10 applied with the present exemplary embodiment, when impact load (F) has been input to the dash cross member 50, a portion of the impact load (F) can be efficiently transmitted to the tunnel section 28 side, while securing degrees of freedom for design peripheral to the instrument panel, not illustrated in the drawings.

Moreover in the present exemplary embodiment, as illustrated in FIG. 5, the front flange 96A of the inner torque box 88 and the front flange 54A of the dash cross member 50 are respectively joined to the floor panel 24 in a state opposing each other across the floor panel 24. Namely, the front end (the front flange 54A) of the dash cross member 50 and the front end (the front flange 96A) of the inner torque box 88 are joined to the floor panel 24 in a state opposing each other.

Accordingly, as illustrated in FIG. 6 and FIG. 7, in a frontal collision such as a small overlap collision or an oblique collision, impact load (F) transmitted to the dash cross member 50 can be efficiently transmitted to the lower tunnel reinforcement 34 in a state in which load transmission loss is suppressed.

As described above, in the present exemplary embodiment, as illustrated in FIG. 5, the front flange 96A of the inner torque box 88 is disposed on the side member 68 side, and is joined to the floor panel 24 in a state opposing the front flange 54A of the dash cross member 50. Load transmission efficiency toward the diagonal rear side is accordingly increased in comparison to a configuration in which, for example, the front flange 96A of the inner torque box 88 were joined to the floor panel 24 in a state opposing the front flange 35A of the lower tunnel reinforcement 34.

In the present exemplary embodiment, as illustrated in FIG. 4, for example, the front flange 54A of the dash cross member 50 and the front flange 35A of the lower tunnel reinforcement 34 are joined to the floor panel 24 at positions opposing each other across the floor panel 24. However, configuration may also be made in which the dash panel 16 is interposed instead of the floor panel 24.

In the present exemplary embodiment, the lower tunnel reinforcement 34 and the tunnel section 28 are formed as separate bodies; however the two may be integrally formed together. Moreover, the lower tunnel reinforcement 34, the tunnel section 28 and the floor panel 24 may all be integrally formed together.

In the present exemplary embodiment, explanation has been given regarding an example in which the vehicle lower section structure 10 according to the present exemplary embodiment is applied to the floor panels 24 on both sides in the vehicle width direction. However, the vehicle lower section structure 10 may be installed to the floor panel 24 on only one side in the vehicle width direction.

Explanation has been given regarding an exemplary embodiment of the present disclosure, however the present disclosure is not limited to such an exemplary embodiment, and the exemplary embodiment may be employed in combination with various modified examples. Obviously various embodiments may be implemented within a range not departing from the spirit of the present disclosure.

What is claimed is:

1. A vehicle lower section structure comprising:
a rocker that extends in a vehicle front-rear direction at a vehicle width direction outer side of a floor section of a vehicle compartment;
a tunnel section that extends in the vehicle front-rear direction at a central portion of the floor section in the vehicle width direction, and that projects toward the upper side in a vehicle up-down direction;
a pair of dash cross members that extend in the vehicle width direction at a lower side of a dash panel provided at a front portion of the floor section in the vehicle front-rear direction, that are separated by the tunnel section, and that couple together the rocker and the tunnel section; and
tunnel reinforcement that is disposed at a lower side of the floor section in the vehicle up-down direction and at an outer side of the tunnel section in the vehicle width direction, and that extends in the vehicle front-rear direction,
wherein a first front flange is formed at a front end of the dash cross member in the vehicle front-rear direction, and is joined to either the dash panel or the floor section, and
wherein a second front flange is formed at a front end of the tunnel reinforcement in the vehicle front-rear direction, and is joined to either the dash panel or the floor section at a position opposing the first front flange across the dash panel or the floor section.

2. The vehicle lower section structure of claim 1, further comprising:
a side member that is disposed at the outer side of the tunnel section in the vehicle width direction and at a front side of the floor section in the vehicle front-rear direction, and that extends in the vehicle front-rear direction; and
an inner torque box that is disposed between the side member and the tunnel reinforcement at an angle toward the vehicle width direction inner side on progression toward the vehicle front-rear direction rear side, with a front end of the inner torque box joined to a vehicle width direction inner side of the side member, and a rear end of the inner torque box joined to the tunnel reinforcement.

3. The vehicle lower section structure of claim 2, wherein:
a third front flange is formed at a front end of the inner torque box in the vehicle front-rear direction, and is joined to either the dash panel or the floor section at a position opposing the first front flange across the dash panel or the floor section.

* * * * *